(12) United States Patent
Nation

(10) Patent No.: US 7,379,422 B2
(45) Date of Patent: May 27, 2008

(54) FLOW CONTROL ENHANCEMENT

(75) Inventor: George Wayne Nation, Eyota, MN (US)

(73) Assignee: LSI Logic Corporation, Milpitas, CA (US)

( * ) Notice: Subject to any disclaimer, the term of this patent is extended or adjusted under 35 U.S.C. 154(b) by 1027 days.

(21) Appl. No.: 10/325,114

(22) Filed: Dec. 20, 2002

(65) Prior Publication Data

US 2004/0120334 A1    Jun. 24, 2004

(51) Int. Cl.
*H04L 12/26* (2006.01)
*H04L 12/56* (2006.01)
*H04L 12/54* (2006.01)
*H04J 3/16* (2006.01)

(52) U.S. Cl. ............... 370/230.1; 370/231; 370/237; 370/248; 370/253; 370/413; 370/419; 370/429; 370/466; 709/235

(58) Field of Classification Search .............. None
See application file for complete search history.

(56) References Cited

U.S. PATENT DOCUMENTS

| | | | |
|---|---|---|---|
| 6,167,029 A * | 12/2000 | Ramakrishnan | 370/235 |
| 6,295,281 B1 * | 9/2001 | Itkowsky et al. | 370/293 |
| 6,405,258 B1 * | 6/2002 | Erimli et al. | 709/235 |
| 6,704,280 B1 * | 3/2004 | Mangin et al. | 370/230 |
| 6,754,179 B1 * | 6/2004 | Lin | 370/235 |
| 6,912,603 B2 * | 6/2005 | Kanazashi | 710/29 |
| 7,002,967 B2 * | 2/2006 | Denton et al. | 370/395.5 |
| 7,061,866 B2 * | 6/2006 | Connor | 370/235 |

OTHER PUBLICATIONS

"Flow Control in IXF1010 and IXF1110 10-port Gigabit Ethernet Media Access Controller", Intel Application Note, Order No. 250236-001, pp. 1-8, Apr. 28, 2002.

* cited by examiner

*Primary Examiner*—Melanie Jagannathan
(74) *Attorney, Agent, or Firm*—Christopher P. Maiorana, P.C.

(57) ABSTRACT

A networking/communication chip having a receiving buffer or FIFO whereby it receives data from a data source across a network and transfers the data to a host system. The memory in the host system acts as a logical extension of the receiving buffer in the chip; in this way, the host system controls the flow of data from the source, rather than the control flow being based on the capacity of the receiving buffer in the networking/communication chip. The networking/communication chip may be a controller, such as a 10 Gigabit Ethernet controller, wherein data received from the source in one protocol is transformed to a second protocol input to the host. If either or both the networking/communication chip or the host system is/are made of FPGAs, it/they can be reprogrammed to disable the flow control in the networking/communication chip and enable flow control in the host system. Data flow is enhanced because memory in the host system typically is much larger than memory in the networking/communication chip.

20 Claims, 1 Drawing Sheet

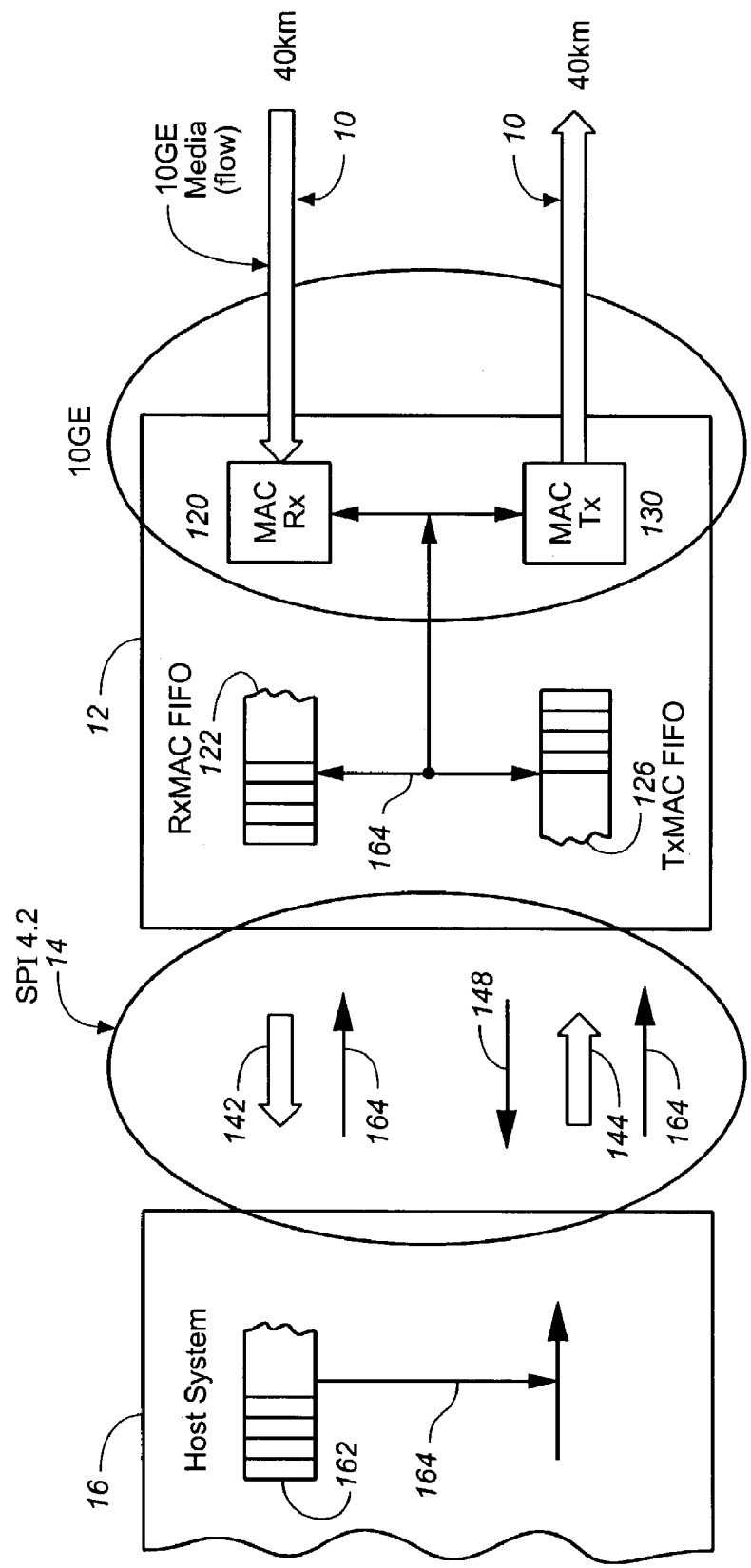
FIG._1

FLOW CONTROL ENHANCEMENT

FIELD OF THE INVENTION

This invention relates to the field of electronic communication and networking chips, and more particularly to a chip and a method of disabling the generation of a pause frame in a media access controller and enabling a host system to become a logical extension of the receiving buffer.

BACKGROUND

Increasingly so, the world relies on data communication over networks of computers wherein two or more computer systems are connected and communicate with each other. There are large networks that span the globe, such as the Internet, and there are smaller networks, such as a between adjacent desks in the same room. There are many types of networks but some of the most common classifications of network are based on the distances between the computers or microprocessor driven devices in the network. A home-area network (HAN) is a network contained within a user's home that connects a person's digital devices. A local-area network (LAN) is one wherein the computers are geographically close together, for instance, in the same building. Most LANs connect workstations and personal computers. Each individual computer in a LAN may have its own CPU with which it executes programs, but it also is able to access data and devices anywhere on the LAN. This means that many users can share expensive devices, such as laser printers, storage resources, software applications, etc. Users also use the LAN to communicate with each other and share data. Storage area networks (SAN) are those networks connected to massive digital data storage banks. A campus-area network (CAN) is where the computers are within a limited geographic area, such as a campus or military base. A metropolitan-area network (MAN) is a data network designed for a town or city. A wide-area network (WAN) is where the computers are farther apart and are connected by telephone lines or radio waves.

Not only the distance, but also the following characteristics are used to categorize different types of networks. Computers on a network are sometimes called nodes. Computers and devices that allocate resources for a network are called servers. The topology refers to the geometric arrangement of a computer system, such as a bus, star, and ring. A bus topology is like a long street with computers or nodes each have access to the server. A star is like a cul-de-sac where the nodes access the center, like a hub. A ring topology is where data flows through the nodes between the source and destination. Protocol defines a common set of rules and signals that computers on the network use to communicate; one of the most popular protocols for LANs is called Ethernet. Architecture can use either a peer-to-peer architecture wherein each node has direct access to another node or client/server architecture wherein communication is through a server than to another node. Networks vary from one another by the media connecting the node, such as twisted-pair wire, coaxial cables, fiber optic cables, wireless, satellite, etc.

A challenging problem in network is the delay effects. The time to read data and to send a control signal to a transmitter through the network depends on the characteristics of the network as above. The overall performance of a networked system can be significantly affected by network delays, and the severity of the problem is aggravated when data loss occurs during a transmission. Delays not only degrade the performance of a network, but also can destabilize the network.

One mode of data transmission is a full-duplex mode that allows two nodes to simultaneously exchange data over a point to point link, or peer-to-peer link, connecting exactly two stations to avoid contention for the medium. Full duplex further provides independent transmit and receive paths. Because each node can simultaneously transmit and receive data, the aggregate throughput of the link is effectively doubled. Thus, a 10 megabit per second (Mbps) node operating in full-duplex mode provides a maximum bandwidth of 20 Mbps, i.e., 10 Mbps going out and 10 Mbps coming in. Full-duplex operation requires a physical medium capable of supporting simultaneous transmission and reception without interference.

The addition of full-duplex mode to the Ethernet protocol standard includes an optional flow control operation known as PAUSE frames. PAUSE frames permit one end station to temporarily stop all traffic from the other end station, except for certain control frames. For example, a full-duplex link connects two devices called "A" and "B". Suppose A transmits frames at a rate faster than B can either process or receive them because B has no remaining buffer space to receive additional frames. B now transmits a PAUSE frame to A requesting that A stop transmitting frames for a specified period of time. Upon receiving the PAUSE frame, A suspends further frame transmission until the specified time period has elapsed to allow B time to catch up and/or recover from the congestion state. At the end of the specified time period, A resumes normal transmission of data frames. Note that the PAUSE frame protocol is bidirectional; A may send frames to pause B, and B may send frames to pause A. A PAUSE frame is the one type of frame that a node is allowed to send even if it is currently in the paused state.

The format of a PAUSE frame conforms to the standard Ethernet frame format and includes a unique type field and other parameters. The destination address of the frame may be set to either a unique node, or to the globally assigned multicast address reserved by the IEEE 802.3 standard for use in MAC Control PAUSE frames and the IEEE 802.1D bridging standard as an address that will not be forwarded. This ensures the frame will not propagate beyond the local link segment. The Type field of the PAUSE frame indicates the frame is a MAC Control frame. The MAC Control opcode field indicates the type of MAC Control frame being used is a PAUSE frame; it being the only type of MAC Control frame currently defined. The MAC Control Parameters field contains a 12-bit value that specifies the duration of the PAUSE event in units of 512-bit times. If an additional PAUSE frame arrives before the current PAUSE time has expired, its parameter replaces the current PAUSE time, so a PAUSE frame with parameter zero allows traffic to resume immediately. A 42-byte reserved field (transmitted as all zeros) is required to pad the length of the PAUSE frame to the minimum Ethernet frame size.

| Preamble (7-bytes) | Start Frame Delimiter (1-byte) | Dest. MAC Address (6-bytes) = (01-80-C2- | Source MAC Address (6- | Length/Type (2-bytes) = 802.3 MAC | MAC Control Opcode (2-bytes) = | MAC Control Parameters (2-bytes) = | Reserved (42-bytes) = all | Frame Check Sequence (4-bytes) |

| -continued | | | | | |
|---|---|---|---|---|---|
| 00-00-01) or unique DA | bytes) | Control (88-08) | PAUSE (00-01) | (00-00 to FF-FF) | zeros |

Predominantly, in the 10 Gigabit Ethernet protocol, network processor units/framers//MACs/etc., use either SPI4.2, SPI4.1/CSIX, or SFI interfaces to go between chips. SPI4.2 interfaces are parallel interfaces and in the case of SPI4.2 specifically it is sixteen differential data lines each running at ~700 Mbps. While not trivial to design, SPI4.2 is relatively stable technology and is available in field programmable gate arrays (FPGAs) today. Thus, SPI4-2 is a flexible system-level interface, suitable for point-to-point connections between MACs and network processor units (NPUs), or switch fabric devices for converged systems in LAN/WAN/MAN/SAN environments.

Flow control refers to the techniques to throttle the flow of data to minimize data loss. In a node, the receiving and transmitting integrated circuit or chip may have several functions, one of which is to generate and/or receive the signals through hardware referred to as a PHY. A PHY is the actual transceiver. After the PHY is a media access controller (MAC). For Ethernet, the MAC sublayer is required to perform two main functions: data encapsulation, and media access management. To perform these functions, first-in, first-out (FIFO) queues are created and used in the MAC to store frame data. In an ideal world there would be no data loss resulting from the limitations in network performance or FIFO sizing but in the real world data is lost without a mechanism to limit frame transmission. Data is lost when packet data is received faster than it is transmitted, resulting in filling of the FIFOs. MAC devices either overwrite data in the FIFOs to lose the oldest data or stop writing to the FIFOs and lose the newest data. To avoid data loss, MAC devices must slow down the receive-data stream until the transmit stream has caught up. Flow control is the methodology used to throttle the receive data stream to keep from completely filling the FIFOs. This has created an industry challenge to balance the amount of throughput loss due to flow control versus the amount of data loss without flow control.

In current technology, the flow control mechanism is accomplished within the MAC control sublayer. The FIFO fills as packets are received. Once the FIFO has reached a preprogrammed threshold, the MAC control sublayer signals an internal state machine to transmit a PAUSE frame. This signal informs the link partner to halt transmission for a specified length of time, referred to as "TxOFF" where Tx is an abbreviation for transmit and Rx is an abbreviation for receive. The MAC continues to transmit PAUSE frames with the programmed idle time as long as the threshold has been exceeded. If the FIFO level falls below the threshold prior to the expiration of this time, another PAUSE frame is sent with a zero time specified to re-enable transmission, referred to as "TxON."

To determine the FIFO threshold, the prior art devices MAC devices have per-port programmable FIFO high and low thresholds. The high threshold is the threshold above which flow control is implemented, and the low threshold is the threshold below which the flow control is terminated. Proper FIFO threshold selection determines the effectiveness of the implemented flow control. To ensure no data is lost, the FIFO threshold should be set low enough to allow for storage of the maximum amount of data that could be received prior to the flow control taking effect. To ensure maximum throughput, the FIFO threshold should be set high enough to not empty the FIFO prior to the flow control being released, and high enough to limit the percentage of time that flow control needs to be activated. Many system constraints must be considered when implementing flow control, such as packet size, duplex mode, link speed, media link segment length and type, the MAC-PHY latency.

To avoid an overflow condition, the FIFO typically stores the amount of data that can be received prior to the flow control taking effect. This amount of data is quantified as the combination of the amount of time for data transmitted from the link partner to reach the MAC receiver after the FIFO threshold is exceeded and corresponds to data currently traveling along the media, i.e., data that has been transmitted but not received. All media has an inherent time delay and the length of the delay is dependent upon the type and length of the media. Also to be considered is the preparation time for the MAC latency to respond to over threshold and send out a PAUSE frame that is dependent upon duplex and supported packet size. There are a number of small time periods to be considered in order calculate the appropriate thresholds: the time to wait between transmissions, the time to transmit the pause packet that needs to be accounted for, the time for the pause packet to reach the link partner, the time to transfer the pause packet through the PHY to the MAC, the time for the receiving MAC to react to the PAUSE frame, and the packet delay in that the receiving MAC could have just started transmission of another packet, which has to be completed before flow control takes effect, etc.

To avoid an underflow condition, the FIFO must have enough stored data to continue transmitting for the time to terminate the flow control. The amount of stored data must exceed the combination of the following: the preparation time to send out the new PAUSE frame with zero time, the time to wait for the current transmission to end, the required time to wait between transmissions, the time to transmit the pause packet that needs to be accounted for, the time for the pause packet to reach the link partner, the time to transfer the pause packet through the PHY to the MAC, the time for the receiving MAC to react to the PAUSE frame, and the delay through the media once the link partner has decided to re-start transmission before the data reaches the other end. For example, for an optical fiber or other media of a distance of two kilometers and a 1030 byte frame, the FIFO depth would be on the order of 10 kilobytes. For a distance of approximately 40 kilometers, a FIFO might have to accommodate one-half megabytes of data. Thus, as distances between nodes increase in a network, the size of this FIFO also gets larger, and the cost of memory becomes prohibitive. There is thus a need in the industry to accommodate larger distances in networks without fear of losing data during the transmission of a PAUSE frame while still maintaining low costs.

SUMMARY OF THE INVENTION

To satisfy these needs and to set forth further advantages, what is presented herein is method of transmitting digital data, comprising the steps of: receiving electronic and/or optical data from a data source in a first protocol, storing the received data in a first receiving buffer, converting the data to a second protocol and then transmitting the data to a second receiving buffer or FIFO wherein when the second receiving FIFO fills to a threshold capacity, a PAUSE frame is generated in the second protocol and then transmitted to the data source in the first protocol. The threshold capacity is programmable and depends upon the factors comprising the storage capacity of the first receiving buffer, the storage capacity of the second receiving buffer or FIFO, and the distance and delay from the source to the second receiving buffer or FIFO. The first receiving buffer may be in a networking/communication chip. In one embodiment, the first protocol is 10 Gigabit Ethernet, and the second protocol is SPI4.2. If the networking/communication chip has a FPGA, then the FPGA can be programmed to disable any logic whereby the first FPGA generates its own PAUSE frame. The second receiving FIFO may be in a host system connected to the networking and communication chip; and if the host system contains a FPGA, it, too, can be programmed to generate a PAUSE frame when the second receiving FIFO has filled to the threshold capacity.

The invention may also be considered a data transmission system, comprising a host system to receive data from a source; a networking/communication chip connected between the host system and the source; a first receive buffer in the networking/communication chip, a second receive FIFO in the host system; and logic within the host system to generate a PAUSE frame when the second receive FIFO fills to a threshold capacity dependent upon the distance and media the data is transmitted for a source, the logic to generate the PAUSE frame being independent of the capacity of the first buffer in the networking/communication chip. It is further contemplated that the networking/communication chip changes protocol of the data from a first protocol output from the source to a second protocol input to the host system.

In an embodiment, the invention may be a data transmission system, comprising: a 10 Gigabit Ethernet controller connected to a data source to receive/transmit data in 10 Gigabit Ethernet protocol, a first receiving media access controller in the 10 Gigabit Ethernet controller connected to a first receiving buffer in the controller, a receiving host system connected to the 10 Gigabit Ethernet controller to receive/transmit data in a protocol other than the 10 Gigabit Ethernet protocol, a second receive FIFO in the host system to receive data from the 10 Gigabit Ethernet controller, wherein control flow of the data from the source is independent of the capacity of the first receive buffer or FIFO in the 10 Gigabit Ethernet controller.

BRIEF DESCRIPTION OF THE DRAWINGS

The numerous advantages of the present invention may be better understood by reference to the accompanying figure, FIG. 1, a simplified functional diagram of a host system and a data transport controller incorporating features of the invention.

DESCRIPTION OF THE INVENTION

Referring to FIG. 1, a networking and communication chip 12, such as a 10 Gigabit Ethernet controller, is shown between a host system 16 and a data 10. Data 10 is preferably in 10 Gigabit Ethernet protocol and may travel on the order of 40 kilometers, more or less, depending upon the transmission medium and whether there are any boosters on the path. The communication or network chip 12 may be a field programmable gate array (FPGA). Alternatively, the networking and communication chip may be one as disclosed in U.S. Patent Application Publication 20040114622 A1 entitled Flexible Template Having Embedded Gate Array and Composable Memory for Integrated Circuits, published 17 June 2004, hereby incorporated by reference in its entirety. The networking chip 12 preferably is full duplex, meaning that data 10 enters the networking chip 12 on one path independent of data transmission on another path in the same protocol as that being received. Similarly, data is output from the networking chip 12 to a system 16 and data is received from the system in the same protocol 10, such as SPI4.2 protocol. System 16 may be, for instance, a router, a network switch, a computer, another FPGA, so long as the host system 16 has at least several megabytes of memory available for incoming data storage. The particular protocols, e.g., 10 Gigabit Ethernet and 5P14.2, are given by way as a realistic scenario; one of skill in the art will appreciate that the features and aspects of the invention apply equally to other data transmission protocols. The PHY and other components of the networking chip 12 are not shown. Associated with the receiving MAC 120 of the controller 12 is a MAC receiving buffer 122 which because of the entry may be as small as having one entry or could be FIFO or larger, and associated with the transmitting MAC 130 is a MAC transmitting FIFO 126.

The inventor observed that the host system 16 always has significantly more memory than a networking and communication chip 12. The inventor further recognized that the process of data transfer can advantageously use the system's memory. Unlike the prior art, the invention herein considers the system memory, and in particular, a system receiving FIFO 162 as a logical extension of the MAC receiving buffer 122 for purposes of data buffering. Thus, as the MAC receiving buffer 122 fills up, the data overflows from the networking chip 12 across to the host 16 to the system receiving FIFO 162.

If however, to be assured of no data loss, a threshold could be programmed in the host system 16 to account for the system receiving FIFO 162 and the MAC receiving buffer 122. This threshold would be much larger. At the point where the system receiving FIFO 162 is nearing capacity but still retaining enough capacity for data to be received while the PAUSE frame is generated, transmitted, received, and interpreted by the data source, the system 16 sends a flow control PAUSE frame 164 to either or both the MAC receiving buffer 122 which, in turn, could simple forward the PAUSE frame 164 to the source, or, in response, the MAC receiving buffer 122 could generate its own PAUSE frame 124. A preferred alternative is that the MAC's threshold and control flow logic is either disabled or nonexistent, and the system's flow control PAUSE frame 164 would be transmitted directly to the MAC transmitting FIFO 126 and then to the source.

If either or both the networking/communication chip and the host system comprise FPGAs, the FPGA in the networking/communication chip can be reprogrammed to disable its logic that it may have to generate a PAUSE frame. In the event that the host system's receiving FPGA does not have logic to generate a PAUSE frame once its system receiving FIFO nears the threshold capacity, the host system too can be reprogrammed to enable logic to generate a PAUSE frame. One of skill in the art can thus appreciate that extending the logical capacity of the MAC receiving FIFO to include the system receiving FIFO can be enabled after the chip and system have been installed and used in the field, i.e., the logic can be effected retroactively. This greatly enhances the flexibility of an already-installed, in-use system to be modified to connect to data sources at a larger distance and/or having a greater bandwidth.

The result of logically extending the MAC receiving buffer 122 to the system receiving FIFO 162 is a much simpler and smoother process for data transmission to accommodate larger blocks of data, as in a burst data transfer, and the ever increasing transmission rates. First, there is no need for logic within the controller 12 or the system 16 to either calculate or continuously observe whether the MAC receiving buffer 122 is approaching a threshold level because it essentially never gets full. One will appreciate that this capacity to utilize the host system's storage and logic is particularly useful in long haul networks such as MANs and WANs. While the embodiment herein illustrates the invention in an Ethernet controller interface for 10 Gigabit Ethernet with SPI4.2, it is not intended to be particularly limited to these protocols. In fact, the invention is intended to be limited only by the following claims.

What is claimed is:

1. A method of transmitting data, comprising the steps of:
   (a) receiving the data at a first circuit from a source in a first protocol;
   (b) storing the data in a receive buffer of the first circuit while the receive buffer is less than full and overflowing the data from the first circuit to a second circuit while the receive buffer is full, wherein the overflowing bypasses the receive buffer and transfers the data to a memory of the second circuit such that the memory and the receive buffer operate as a single FIFO with the memory forming a logical extension of the receive buffer;
   (c) converting the data between the first protocol and a second protocol in the first circuit;
   (d) transmitting the data in the second protocol from the first circuit to of the second circuit;
   (e) generating a first PAUSE frame in the second circuit when the memory fills to a programmable threshold, wherein the programmable threshold depends upon both (i) a first storage capacity of the receive buffer and (ii) a second storage capacity of the memory; and
   (f) transmitting the first PAUSE frame.

2. The method of transmitting data, as in claim 1, wherein the first circuit comprises a chip coupled to the source through a network.

3. The method of transmitting data, as in claim 1, wherein the first protocol comprises 10 Gigabit Ethernet, and the second protocol comprises SPI4.2.

4. The method of transmitting data, as in claim 1, wherein the first circuit comprises an FPGA.

5. The method of transmitting data, as in claim 1, further comprising the step of:
   disabling logic in the first circuit, the logic when enabled being configured to generate a second PAUSE frame transmitted to the source when the receive buffer alone is almost full.

6. The method of transmitting data, as in claim 1, further comprising the step of:
   programming the second circuit to generate the first PAUSE frame when a combination of the receive buffer and the memory has filled to the programmable threshold.

7. The method of transmitting data, as in claim 1, further comprising the steps of:
   generating a second PAUSE frame in the first circuit upon reception of the first PAUSE frame; and
   transmitting the second PAUSE frame from the first circuit to the source.

8. The method of transmitting data, as in claim 1, further comprising the step of:
   forwarding the first PAUSE frame from the second circuit through the first circuit to the source.

9. A data transmission system, comprising:
   a host having a memory to receive data from a source; and
   a chip connected between the host and the source, the chip storing the data in a receive buffer while the receive buffer is less than full and overflowing the data to the host while the receive buffer is full, wherein (i) the overflowing bypasses the receive buffer and transfers the data to the memory of the host such that the memory and the receive buffer operate as a single FIFO with the memory forming a logical extension of the receive buffer, (ii) the host generates a first PAUSE frame when the memory fills to a programmable threshold, and (iii) the programmable threshold depends upon both (a) a first storage capacity of the receive buffer and (b) a second storage capacity of the memory.

10. The data transmission system of claim 9, whereby the chip changes protocol of the data between a first protocol used by the source and a second protocol used by the host.

11. The data transmitting system of claim 9, wherein the host is further configured to generate the first PAUSE frame when a combination of the receive buffer and the memory has filled to the programmable threshold.

12. The data transmitting system of claim 9, wherein chip comprises logic that has been disabled, the logic when enabled being configured to generate a second PAUSE frame transmitted to the source when the receive buffer alone is almost full.

13. The data transmitting system of claim 9, wherein the chip is further configured to (i) generate a second PAUSE frame upon reception of the first PAUSE frame and (ii) transmit the second PAUSE frame to the source.

14. The data transmitting system of claim 9, wherein the chip is further configured to forward the first PAUSE frame from the host to the source.

15. A data transmission system, comprising:
   a controller connected to a source to exchange data in a 10 Gigabit Ethernet protocol, the controller (i) having a receive buffer, (ii) storing the data in the receive buffer while the receive buffer is less than full and (iii) overflowing the data from the controller to a host while the receive buffer is full, wherein the overflowing bypasses the receive buffer and transfers the data to a memory of the host; and
   the host connected to the controller to exchange the data in a protocol other than the 10 Gigabit Ethernet protocol, wherein (i) the memory is configured as a logical extension of the receive buffer such that the receive buffer and the memory operate as a single FIFO and (ii) control flow of the data from the source depends on a capacity of the receive buffer.

16. The data transmitting system of claim 15, wherein (i) the host is further configured to generate a first PAUSE frame when the memory has filled to a programmable threshold and (ii) the programmable threshold depends upon both (a) a first storage capacity of the receive buffer and (b) a second storage capacity of the memory.

17. The data transmitting system of claim 15, wherein the host is further configured to generate a first PAUSE frame when a combination of the receive buffer and the memory has filled to a programmable threshold.

18. The data transmitting system of claim 17, wherein the controller comprises logic that is disabled, the logic when enabled being configured to generate a second PAUSE frame transmitted to the source when the receive buffer alone is almost full.

19. The data transmitting system of claim 17, wherein the controller is further configured to (i) generate a second PAUSE frame upon reception of the first PAUSE frame and (ii) transmit the second PAUSE frame to the source.

20. The data transmitting system of claim 15, wherein the controller is further configured to forward a first PAUSE frame from the host to the source.

* * * * *